(12) United States Patent
Neisler et al.

(10) Patent No.: US 10,157,032 B2
(45) Date of Patent: Dec. 18, 2018

(54) METHOD FOR LOGICALLY POSITIONING MULTIPLE DISPLAY SCREENS

(71) Applicants: Brian Neisler, San Francisco, CA (US); Matthew Leigh Vroom, San Francisco, CA (US)

(72) Inventors: Brian Neisler, San Francisco, CA (US); Matthew Leigh Vroom, San Francisco, CA (US)

(73) Assignee: HENGE DOCKS LLC, Arlington, VA (US)

( * ) Notice: Subject to any disclaimer, the term of this patent is extended or adjusted under 35 U.S.C. 154(b) by 445 days.

(21) Appl. No.: 14/561,165

(22) Filed: Dec. 4, 2014

(65) Prior Publication Data

US 2016/0162243 A1    Jun. 9, 2016

(51) Int. Cl.
| | | |
|---|---|---|
| *G06F 3/14* | (2006.01) | |
| *G06F 3/041* | (2006.01) | |
| *G09G 5/08* | (2006.01) | |
| *G06F 1/16* | (2006.01) | |
| *H04N 5/445* | (2011.01) | |
| *G06T 7/13* | (2017.01) | |
| *G06T 7/73* | (2017.01) | |
| *G06T 7/33* | (2017.01) | |

(52) U.S. Cl.
CPC .......... *G06F 3/1446* (2013.01); *G06F 3/0418* (2013.01); *G09G 5/08* (2013.01); *G06F 1/1647* (2013.01); *G06F 2203/04803* (2013.01); *G06T 7/13* (2017.01); *G06T 7/337* (2017.01); *G06T 7/73* (2017.01); *G09G 2356/00* (2013.01); *H04N 5/44591* (2013.01)

(58) Field of Classification Search
CPC ................. G06F 3/0418; G06F 3/1446; G06F 2203/04803; G06F 1/1647; H04N 5/44591; G06T 7/13; G06T 7/337; G06T 7/73; G09G 5/08; G09G 2356/00
USPC ................... 715/753; 348/239, 563; 345/158
See application file for complete search history.

(56) References Cited

U.S. PATENT DOCUMENTS

| | | | | |
|---|---|---|---|---|
| 5,923,307 A | * | 7/1999 | Hogle, IV | ........... G06F 3/04897 345/1.3 |
| 5,995,649 A | * | 11/1999 | Marugame | ........... G06K 9/6202 345/419 |
| 6,018,340 A | * | 1/2000 | Butler | ..................... G06F 3/038 345/156 |

(Continued)

OTHER PUBLICATIONS

Tan, Desney S., and Mary Czerwinski. "Effects of visual separation and physical discontinuities when distributing information across multiple displays." Proc. Interact. vol. 3. 2003.*

(Continued)

*Primary Examiner* — Ruay Ho
(74) *Attorney, Agent, or Firm* — Benjamin E. Maskell (57) ABSTRACT

Disclosed is a method for logically positioning a second display screen relative to a first display screen including detecting a collision event of a cursor with an edge the first display screen, logically positioning the second display screen at the edge of the first display screen, calculating a projected path of the cursor, displaying the cursor on the second display screen, detecting a mouse event, calculating an offset between the mouse event and the projected path, and logically repositioning the second display screen consistent with the offset.

16 Claims, 7 Drawing Sheets

Exemplary Physical Arrangement of Display Screens

(56) References Cited

U.S. PATENT DOCUMENTS

| | | | | |
|---|---|---|---|---|
| 6,526,166 | B1* | 2/2003 | Gorman | G06T 7/579 345/427 |
| 6,573,913 | B1* | 6/2003 | Butler | G06F 3/1423 345/1.1 |
| 8,743,019 | B1* | 6/2014 | Eng | G06F 3/1454 345/1.1 |
| 9,298,413 | B1* | 3/2016 | Karve | G06F 3/1446 |
| 2003/0202691 | A1* | 10/2003 | Beardsley | G06T 7/85 382/154 |
| 2003/0206179 | A1* | 11/2003 | Deering | G06T 3/0081 345/589 |
| 2005/0083331 | A1* | 4/2005 | MacKinlay | G06F 3/1446 345/473 |
| 2006/0001593 | A1* | 1/2006 | Baudisch | G06F 3/1446 345/1.1 |
| 2006/0033712 | A1* | 2/2006 | Baudisch | G06F 3/038 345/157 |
| 2006/0168859 | A1* | 8/2006 | Pombo | G02B 7/023 40/611.07 |
| 2006/0206825 | A1* | 9/2006 | Dorn | G06F 3/0481 715/761 |
| 2006/0256110 | A1* | 11/2006 | Okuno | G06F 3/0346 345/419 |
| 2007/0024645 | A1* | 2/2007 | Purcell | G06F 3/1431 345/634 |
| 2010/0001925 | A1* | 1/2010 | Kim | G06F 3/1446 345/1.3 |
| 2010/0045594 | A1* | 2/2010 | Jenks | H04N 9/12 345/156 |
| 2010/0123732 | A1* | 5/2010 | Jenks | H04N 9/12 345/592 |
| 2010/0321410 | A1* | 12/2010 | Jenks | G06F 3/1446 345/676 |
| 2011/0019108 | A1* | 1/2011 | Nelson | H04N 9/31 348/745 |
| 2011/0047489 | A1* | 2/2011 | Orr | G06F 3/0482 715/764 |
| 2011/0228104 | A1* | 9/2011 | Nelson | H04N 9/3147 348/190 |
| 2011/0298824 | A1* | 12/2011 | Lee | G06F 3/011 345/633 |
| 2012/0013638 | A1* | 1/2012 | Miceli | G06F 3/1446 345/611 |
| 2012/0120103 | A1* | 5/2012 | Border | G02B 27/017 345/633 |
| 2012/0188454 | A1* | 7/2012 | Hasegawa | H04N 5/765 348/563 |
| 2013/0002551 | A1* | 1/2013 | Imoto | G06F 3/013 345/158 |
| 2013/0086528 | A1* | 4/2013 | Lee | G06F 3/1454 715/838 |
| 2013/0120224 | A1* | 5/2013 | Cajigas | G09G 5/00 345/8 |
| 2013/0241801 | A1* | 9/2013 | Petrik | G06F 3/1423 345/1.1 |
| 2014/0085194 | A1* | 3/2014 | Ye | G06F 3/01 345/156 |
| 2015/0002371 | A1* | 1/2015 | Burgess | G09G 5/12 345/1.2 |
| 2015/0029465 | A1* | 1/2015 | Ishikawa | G06T 3/005 353/30 |
| 2015/0103210 | A1* | 4/2015 | Inoue | G02B 7/346 348/239 |
| 2016/0086572 | A1* | 3/2016 | Nasiriavanaki | G09G 5/026 345/590 |
| 2016/0129340 | A1* | 5/2016 | Gruber | A63F 9/1204 273/157 R |

OTHER PUBLICATIONS

Baudisch, Patrick, Edward Cutrell, and George Robertson. "High-density cursor: a visualization technique that helps users keep track of fast-moving mouse cursors." Proc. Interact'03. 2003.*

Baudisch, Patrick, et al. "Mouse ether: accelerating the acquisition of targets across multi-monitor displays." CHI'04 extended abstracts on Human factors in computing systems. ACM, 2004.*

Grudin, Jonathan. "Partitioning digital worlds: focal and peripheral awareness in multiple monitor use." Proceedings of the SIGCHI conference on Human factors in computing systems. ACM, 2001.*

Mackinlay, Jock D., Jeffrey Heer, and Christiaan Royer. "Wideband visual interfaces: Sensemaking on multiple monitors." Palo Alto Research Center Technical Report UIR-2003-05 (2003).*

Czerwinski, Mary, Desney S. Tan, and George G. Robertson. "Women take a wider view." Proceedings of the SIGCHI conference on Human factors in computing systems. ACM, 2002.*

Tralie, Chris, and Chris Koscielny. "Low Budget 3D Model Reconstruction using Space Carving." Chris Tralie: Ph.D. Student in ECE at Duke University. http://www.ctralie.com, Jan. 12, 2010. Web. Mar. 3, 2017. <http://www.ctralie.com/PrincetonUGRAD/Projects/SpaceCarving/>.*

* cited by examiner

FIG. 1

Exemplary Physical Arrangement of Display Screens

FIG. 2

Exemplary Logical Arrangement of Display Screens

FIG. 3

Intermediate Logical Arrangement of Display Screens

FIG. 4

Exemplary Physical Arrangement of Display Screens

FIG. 5

Exemplary Camera Views

FIG. 6B

Exemplary Physical Arrangement of Display Screens

METHOD FOR LOGICALLY POSITIONING MULTIPLE DISPLAY SCREENS

BACKGROUND OF THE INVENTION

Field of the Invention

The embodiments of the invention relate to methods of logically positioning multiple computer monitors, and more particularly, to methods of logically positioning multiple computer monitors with respect to their physical positions. Although embodiments of the invention are suitable for a wide scope of applications, it is particularly suitable for configuring a computer having an unknown arrangement of multiple displays.

Discussion of the Related Art

Computer systems having multiple monitors are desirable to many computer users to increase the effective screen size and resolution without having to purchase costly over-sized monitors. Computer systems having multiple monitors can facilitate a primary task to be displayed on a first monitor while secondary or background tasks are displayed on a second monitor.

Computer systems having multiple monitors can have two concepts of positioning. First, the multiple monitors can have a physical position which corresponds to their position in the real world. Second, the multiple can have a logical position which, in ideal circumstances, corresponds to the physical position. For example, if two monitors are physically positioned side-by-side, a connected computer can logically position the two monitors side-by-side so that a computer user can easily manipulate content displayed on either monitor by moving the mouse cursor between monitors along their shared edge.

The desired logical position of a multiple monitor setup will frequently mirror the physical position of the multiple monitors. In this way, a user can move displayed content between the multiple monitors intuitively according to their physical arrangement. A computer, however, does not by itself know the physical positions of the multiple monitors and thus cannot set the logical positions of the multiple monitors without some additional information.

Methods of logically positioning multiple monitors according to the related art include using a configuration utility associated with a connected computer. The configuration utility can display an image representation of each connected monitor and allow a user to drag-and-drop the image-representations of monitors to correspond with the physical positions of the connected monitors.

While the related art method of logically positioning multiple monitors is technically sufficient to position the monitors, the method, as implemented in current operating systems and control software, is cumbersome, requires excessive manual configuration, and often requires experimentation with poorly described settings in obscure configuration screens.

SUMMARY OF THE INVENTION

Accordingly, embodiments of the invention are directed to a method for logically positioning multiple display screens that substantially obviates one or more of the problems due to limitations and disadvantages of the related art.

An object of embodiments of the invention is to provide an intuitive method for logically positioning multiple monitors.

Another object of embodiments of the invention is to provide a near-automatic method for logically positioning multiple monitors.

Yet another object of embodiments of the invention is to provide a fast method for logically positioning multiple monitors.

Still another object of embodiments of the invention is to provide an adaptive method for logically positioning multiple monitors.

Additional features and advantages of embodiments of the invention will be set forth in the description which follows, and in part will be apparent from the description, or may be learned by practice of embodiments of the invention. The objectives and other advantages of the embodiments of the invention will be realized and attained by the structure particularly pointed out in the written description and claims hereof as well as the appended drawings.

To achieve these and other advantages and in accordance with the purpose of embodiments of the invention, as embodied and broadly described, a method for logically positioning multiple display screens includes detecting a collision event of a cursor with an edge a first display screen, logically positioning a second display screen at the edge of the first display screen, calculating a projected path of the cursor, displaying the cursor on the second display screen, detecting a mouse event, calculating an offset between the mouse event and the projected path, and logically repositioning the second display screen consistent with the offset.

In another aspect, a method for logically positioning multiple display screens includes displaying an first image on a first display screen, displaying a second image on a second display screen, receiving a picture of the first display screen and the second display screen, calculating a relative offset between the first image and the second image, and logically positioning the second display screen with respect to the first display screen consistent with the relative offset.

In yet another aspect, a method for logically positioning multiple display screens includes receiving a first image from a first camera associated with a first display screen, the first image including a reference object, receiving a second image from the second camera associated with a second display screen, the second image also including the reference object, calculating a relative physical position of the second display screen with respect to the first display screen based on the reference object, and logically positioning the second display screen with respect to the first display screen based on the calculated relative physical position of the second display screen.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention.

DETAILED DESCRIPTION OF THE PREFERRED EMBODIMENTS

Reference will now be made in detail to the preferred embodiments of the invention, examples of which are illustrated in the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thicknesses of layers and regions are exaggerated for clarity. Like reference numerals in the drawings denote like elements.

Figure 1:
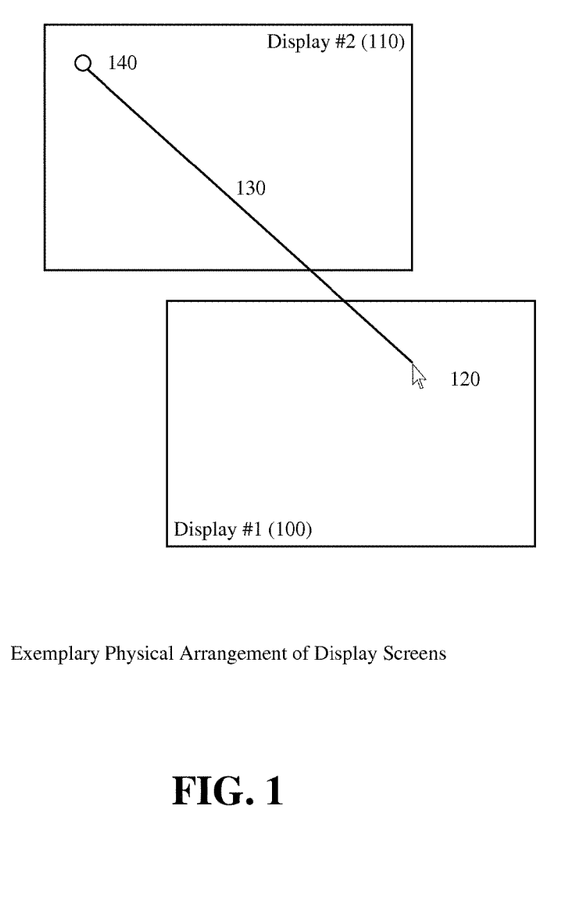
FIG. 1 is an exemplary physical arrangement of two display screens.

FIG. 1 is an exemplary physical arrangement of two display screens. As shown in FIG. 1, an exemplary physical arrangement of two display screens can include a first display screen 100, a second display screen 110, a cursor 120, a target 140, and an intended path 130 to the target. The exemplary physical arrangement of FIG. 1 can be, for example, the physical locations of two monitors. In the example of FIG. 1, the first display screen 100 is located below and to the right of the second display panel 110. The second display screen 110 is located above and to the left of the first display panel 100.

In a configuration initially including only a single display panel, such as display panel 100, the entirety of the display is shown on the first display screen 110. However, when a second display screen 110 is added, the computer (not shown) does not know the physical location of the second display screen 110 in relation to the first display screen 100. Thus, without knowing the relative physical location of the second display screen 110, the computer can not know what content should be displayed on the second display screen 110.

In embodiments of the invention, when a second display screen 110 is attached to the computer system, the computer system can cause a target 140 to be displayed on the second display screen 110. Upon displaying the target 140, the user can move the cursor 120 in the direction of the intended path 130.

Figure 2:
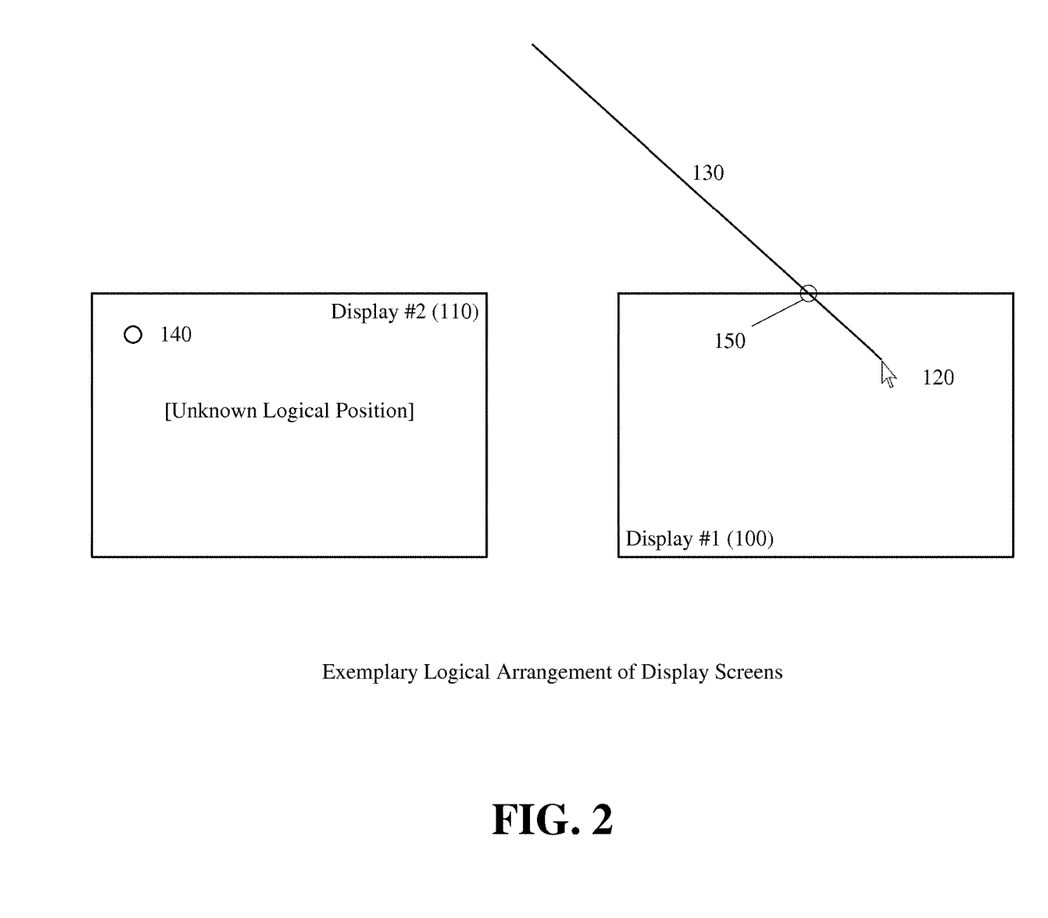
FIG. 2 is an exemplary logical arrangement of two display screens.

FIG. 2 is an exemplary logical arrangement of two display screens. The exemplary logical arrangement can be, for example, a default logical arrangement for two display screens when their relative physical locations are unknown. The exemplary logical arrangement can include a first display screen 100, a second display screen 110, a cursor 120, a target 140, an intended path 130 and a collision point 150. The default logical position of a second display screen 110 having an unknown physical location relative to the first display screen 100 can be to the left of the first display screen 100.

Upon connecting the second display screen 110 to the computer (not shown) the computer can cause the target 140 to be displayed on the second display screen 110. With reference to FIG. 1, the actual physical location of the second display screen 110 is above and to the left of the first display screen 100. However, at this time, the computer (not shown) has not been programmed with the physical location of the second display screen 110 and thus defaults the logical location to simply be to the left of the first display screen 100. When the target 140 is displayed, a user can move the cursor 120 along the intended path 130 to reach the target 140. When the cursor reaches an edge of the first display screen 100, the computer can record a collision event of the cursor 120 with the edge of the first display screen 100. Because the collision point 150 occurred on a top edge of the first display screen 100, the intermediate logical position of the second display screen can be centered at a top edge of the first display screen 100. In the alternative, the intermediate logical position of the second display screen 110 can be disposed such that the intended path 130 crosses a center point (not shown) of the second display screen 110. This alternative intermediate position is ideal, for example, when two display screens are physically positioned such that their respective edges do not overlap or overlap only slightly.

Figure 3:
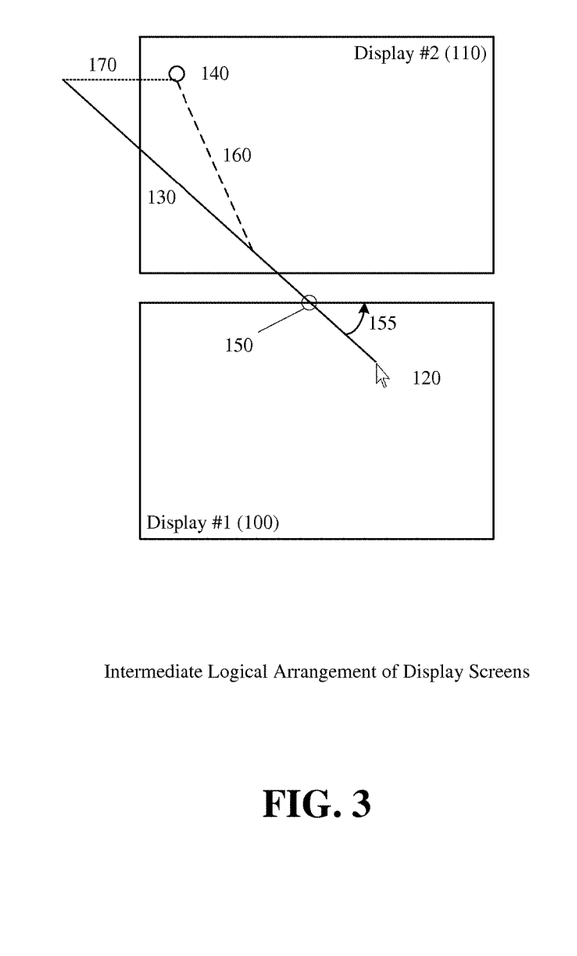
FIG. 3 is an exemplary intermediate logical arrangement of two display screens.

FIG. 3 is an exemplary intermediate logical arrangement of two display screens. As shown in FIG. 3, the second display screen can be set to have an intermediate logical position centered on a top edge of the first display screen. The intended path 130 can be calculated by extending the portion of the intended path 130 on the first display screen 100 on to the second display screen 110 at the same angle of incidence 155. When the cursor 120 crosses the junction between the two monitors, a user will initially move the cursor along intended path 130 for some time until the user realizes the intended path 130 does not align with the logical position of the target 140. At this point (the junction of line 130 and line 160), the user can re-adjust the trajectory of the cursor 120 to the target 140 along new path 160.

Arrival of the cursor 120 at the target 140 can be signaled by a "mouse-over event", a "hover" event, a "click" event, and "unclick" event, or other mouse related event. Upon occurrence of the mouse event, for example a click, an offset 170 can be calculated between the intended path 130 and the location of the mouse event.

The target 140 can be, for example, a special positioning target for calibrating the position of the display panel. The target 140, can also be, for example, a graphical element on the computer desktop such as a window, an icon, a button, or other graphical element. The target does not have to be determined when the second display screen 110 is connected. The target can be determined, for example, upon the occurrence of the first mouse event after the cursor 120 crosses into the second display screen 120. The target can be determined, for example, upon the occurrence of a click event after the cursor 120 crosses into the second display screen 120. The target can be determined, for example when dragging a program window, upon the occurrence of an unclick event after the cursor 120 crosses into the second display screen 120. An offset 170 can be calculated between the intended path 130 and the target 140.

Figure 4:
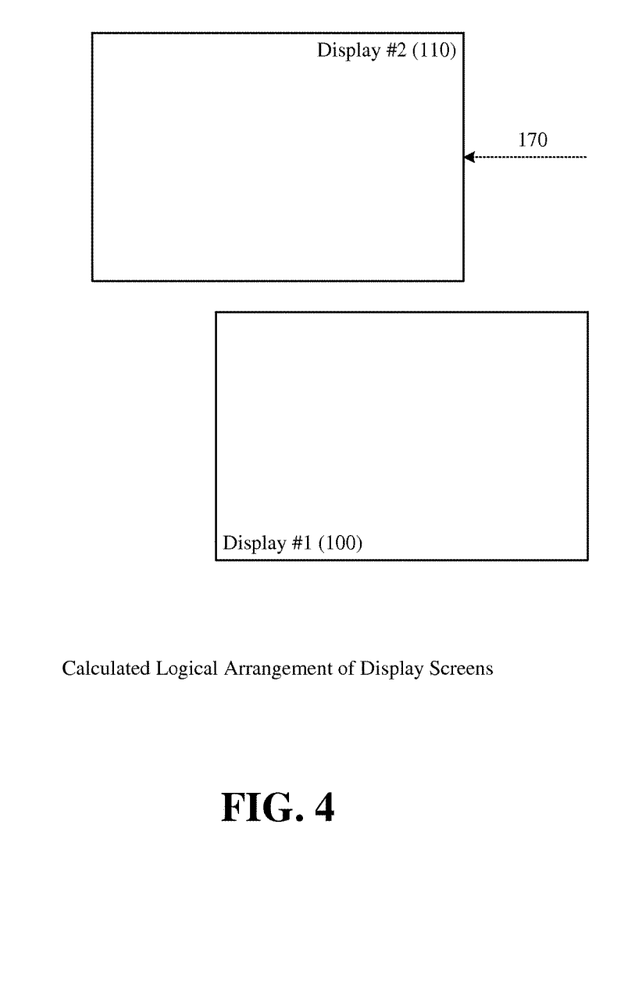
FIG. 4 is an exemplary calculated logical arrangement of two display screens.

FIG. 4 is an exemplary calculated logical arrangement of two display screens. As shown in FIG. 4, the intermediate logical position of the second display screen 110 of FIG. 3 can be shifted to the left by the calculated offset 170. The resulting calculated logical positions of the display screens can be similar to the actual physical positions of the display screens of FIG. 1.

The method of determining the logical position of multiple display screens is further applicable to a computer system having three or more displays screens. For example, in a system having three display screens, a first display screen can be a primary display screen. Each additional display can be added one at a time. After a second display screen is added, the second display screen can be logically positioned in accordance with a collision event and a mouse event as described above. The third and every subsequent display screen can be logically positioned in accordance with a subsequent collision event and mouse event. To prevent ambiguity, each third and subsequent display screen can be programmatically darkened or disabled until the logical position of the second or prior display screen is determined according to the above described method in conjunction with FIG. 1-FIG. 4.

In preferred embodiments of the invention, the calculation of the offset 170 can be calculated iteratively. For example, an initial offset can be calculated as described above and the second display screen 110 positioned accordingly. Each subsequent collision event and mouse event can be used to calculate new offset values which can be averaged with the offset 170. The average can be a limited historical average such that only recent offset values are used to logically position the second display screen. The second display screen can be periodically repositioned consistent with the average offset.

Figure 5:
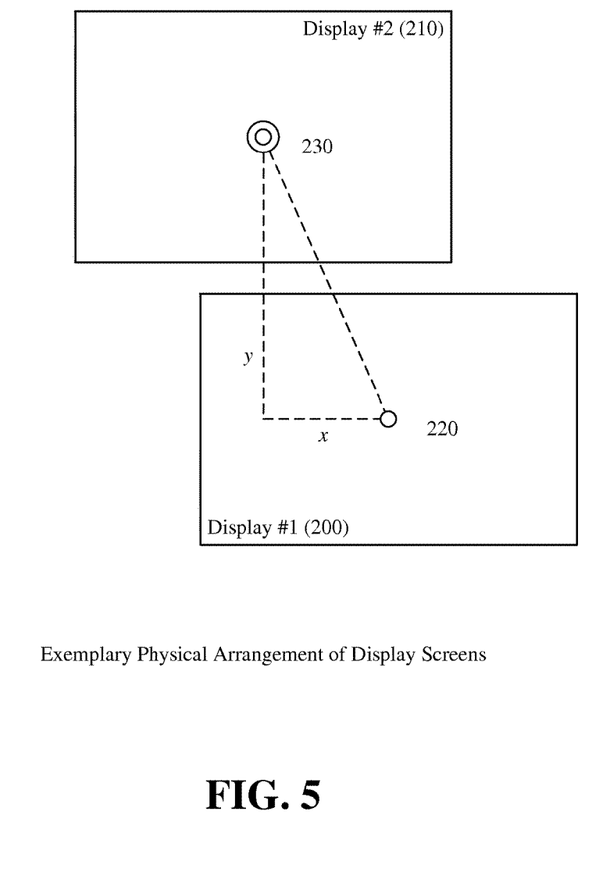
FIG. 5 is an exemplary physical arrangement of two display screens.

FIG. 5 is an exemplary physical arrangement of two display screens. As shown in FIG. 5, an exemplary physical arrangement of two display screens can include a first display screen 200 and a second display screen 210. The first and second display screens can each include a reference image 220 and 230, respectively. The reference images 220 and 230 can be displayed when the second display screen 210 is connected to the computer (not shown). The reference image 220 can be a large red dot displayed on a black screen. The reference image 230 can be a large red dot surrounded by a concentric circle, both displayed on a black screen. In other embodiments of the invention, the reference image does not need to be a particular predetermined shape or symbol. Instead, the reference image 220 and 230 can be the image currently displayed on the display screen 200 or 210 such as the computer desktop or a series of icons.

A user can take a picture of the resulting display using a smart phone, digital camera, webcam, or other imaging device. The resulting picture can be sent to the computer (not shown) by known transmission technologies such as WiFi, Bluetooth, USB, NFC, the Internet, etc. Upon receiving the picture, the computer can calculate a relative offset (x,y) between the first reference image 220 and the second reference image 230. The relative offset can be used to set a logical position of the two display screens 200 and 210 consistent with the physical position of the two display screens 200 and 210.

For example, an imaginary line can be drawn between the first reference image 220 in the direction of the second reference image 230 and the second display screen 210 can be assigned a logical position along the imaginary line such that the top edge of the first display screen 200 is aligned with a bottom edge of the second display screen 210.

In a more specific example, consider a first display screen having display resolution 100,50 (x,y) and a second display screen having display resolution 100,50 (x,y). Each display screen further displays a unique reference image centered at position 50, 25. Assuming further that the physical positions of the display screens are unknown to the computer, a picture of the display screens and reference images can be analyzed to calculate a relative offset in pixels between the first and second reference images. In the specific example, the pixel offset in the picture can be, for example, (−1000, 1000). An angle can be calculated between the origin (0,0) and the pixel offset (−1000,1000), in this case 135 degrees. Thus it now known, from analysis of the picture, that the second display screen is located at 135 degrees from the first display screen. The logical position of the second display screen can then be set to align on the 135 degree axis from the first display screen. More particularly, the second display screen can be logically positioned to such that the second display screen is offset to the left by 50 pixels and up 50 pixels. In preferred embodiments, the pixel offset can be the minimum offset such that the logical positions of the two display screens do not overlap.

In a configuration including three or more displays screens, each display screen can be configured to display a unique reference image. A user can take a picture of the resulting displays using an imaging device. The picture can be transmitted to a computer connected to the display screens. A relative offset can be calculated in pixels, between each of the displays and used to calculate the logical positions of the display screens in the same way for two display screens. In the case of three or more display screens, however, each respective display screen need only have a relative position calculated with respect to one other display screen. More particularly, in the case of three monitors, a first relative position can be calculated between the first and second display screens and a second relative position can be calculated between the second and third display screens. The two relative offsets can specify the logical positions of the three display screens.

Figure 6A:
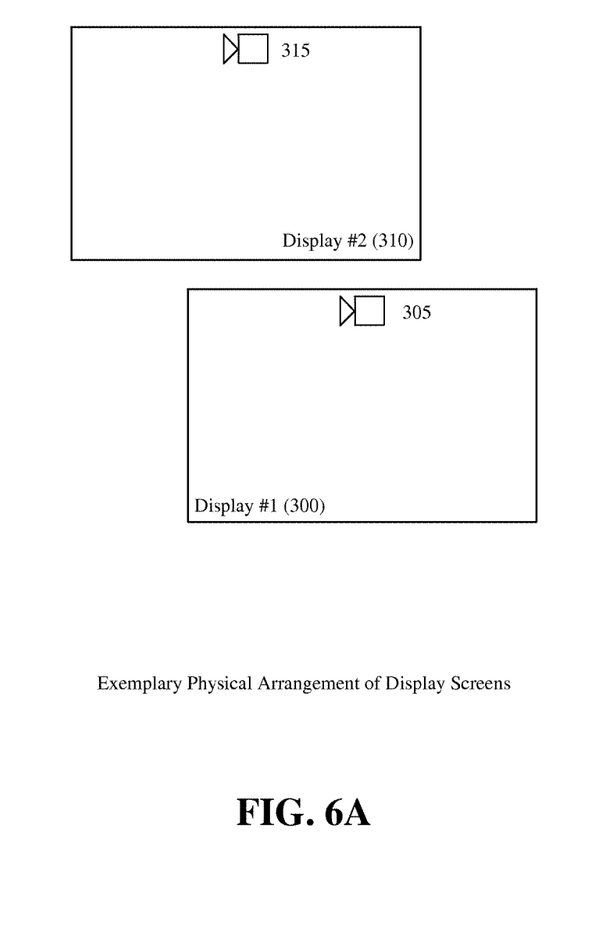
FIG. 6A is an exemplary physical arrangement of two display screens.

FIG. 6A is an exemplary physical arrangement of two display screens. As shown in FIG. 6A, an exemplary physical arrangement of two display screens can include a first display screen 300 and a second display screen 310. Each display screen 300 and 310 can include a camera 305 and 315, respectively. The cameras 305 and 315 can be a simple webcam embedded in the bezel of the display screens 300 and 310. The cameras 305 and 315 can be an external camera positioned or mounted near an edge of the display screens 300 and 310. The cameras can be forward facing such that they are pointed in the same direction as the display screen, that is, each camera can be directed at a user that is viewing the display screen. The cameras 305 and 315 can be oriented so that they are pointed in a direction that is approximately planar to the display screen 300 and 310. The cameras 305 and 315, if disposed at a top edge or in a top bezel of the display screen 300 and 310, can be positioned such that they are pointed slightly downwards so as to be centered on a face of a user sitting approximately three feet from the respective display screen.

Figure 6B:
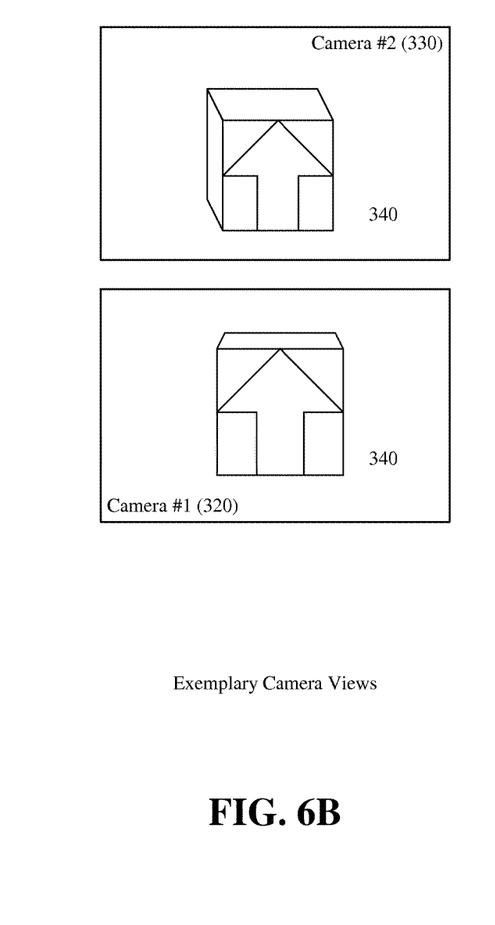
FIG. 6B is two exemplary pictures, each respectively taken from a camera associated with one of the two display screens of FIG. 6A.

FIG. 6B is two exemplary pictures, each respectively taken from a camera associated with one of the two display screens of FIG. 6A. As shown in FIG. 6B, two pictures 320 and 330 can be taken by each of cameras 305 and 315, respectively, of FIG. 6A. A user can position a reference object 340 in the field of view of each camera 305 and 315 and the picture 320 and 330 taken by the camera 305 and 315 can include the reference object 340. Because each camera 305 and 315, by virtue of their proximity to different display screens 300 and 310, is located in a slightly different position, each camera 305 and 315 will take a slightly different image 320 and 330 of the reference object 340.

For example, image 320 can be taken by camera 305 associated with display screen 300. The reference object 340 can be centered on a planar surface approximately level with the bottom of display screen 300. The planar surface can be, for example, a desk or a table. The image 320 from camera 305 can be a front-top view of the reference object 340. A second image 330 can be taken by camera 315 associated with display screen 310. The image 330 from camera 315 can be of a front-top-left view of the reference object 340. The difference between the pictures 320 and 330 can be attributed to the difference between the position of the cameras 305 and 315 and by inference the position of the display screens 300 and 310.

Figure 7:
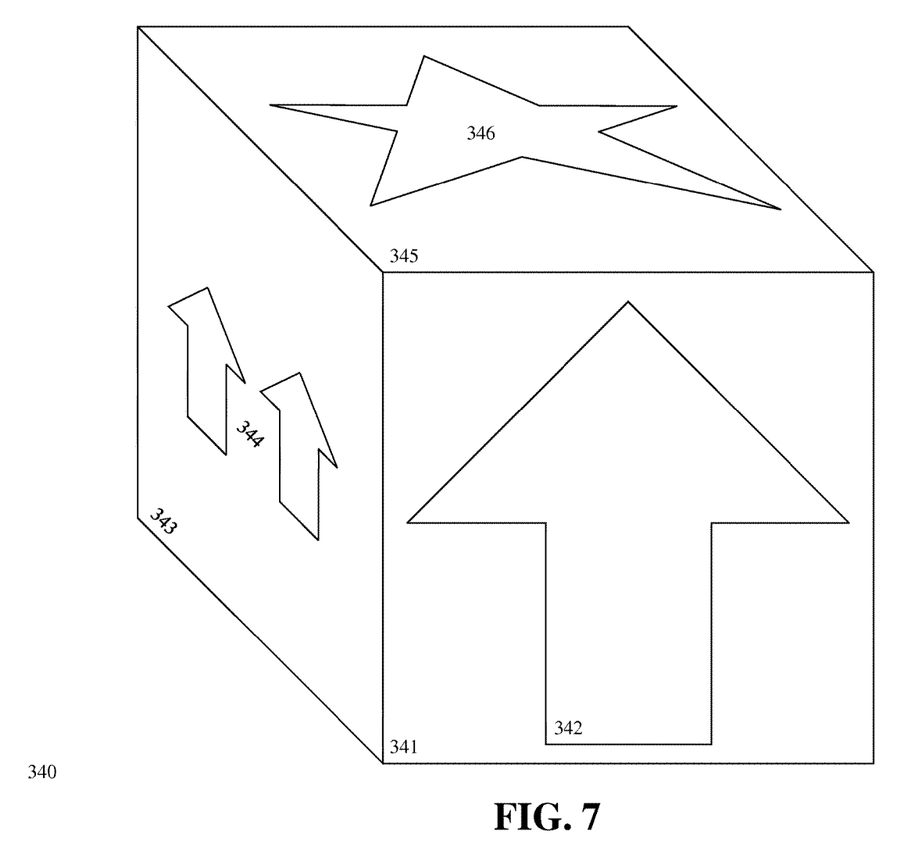
FIG. 7 is an exemplary reference object according to an embodiment of the invention.

FIG. 7 is an exemplary reference object according to an embodiment of the invention. As shown in FIG. 7, a reference object 340 can have a polyhedron shape such as a cube. The polyhedron, in this example a cube, can have a plurality of sides including sides 341, 343, and 345. The reference object 340 can have additional sides, for example the other three faces (not shown) of the cube-shaped polyhedron of FIG. 7. Each side can include markings that are unique from the other sides of the polyhedron.

Side 341 can include an arrow shape 342. Side 343 can include a double-arrow shape 344. Side 345 can include a star shape 346. The other sides (not shown) of the reference object can include other shapes that are unique from other faces of the reference object 340. The other shapes can be, for example, stars, arrows, lines, circles, ovals, numbers, letters, drawings, or other markings sufficient to render each face of the reference object unique from the other faces. In preferred embodiments the shapes can be directional in that viewing a single shape can indicate the identity of the shapes on the other faces when the reference object 340 has a predetermined design. For example, in the reference object 340 of FIG. 7, the face 341 has an upward pointing arrow 342. If the reference object 340 has a known or predetermined design, viewing only the face 341 and arrow 342, the location of the other faces and the orientation of the reference object is known. In the example of the predetermined reference object, it can be predetermined, for example, that the arrow 342 always points to the star 346, the double arrow 344 always points to the star 346, and the face 341 having an upward facing arrow 342 shares a left edge with face 343.

Each face of the reference object can include unique colors to further distinguish the shapes and thus the orientation of the reference object. For example, face 341 can be blue while arrow 342 is red; face 343 can be orange while double-arrow 344 is white; and face 345 can be green while star 346 is purple.

With reference to FIG. 6A, FIG. 6B, and FIG. 7, the images 320 and 330 of the reference object 340 can be used to determine the orientation of the reference object with respect to the cameras 305 and 315 and, by inference, the location of the display screens 300 and 310. For example, the image 320 shows a front and top side of the reference object 340 indicating that the camera 305 (and by inference the display screen 300) is directly across from, and slightly elevated with respect to the reference object. The image 330 shows a front-top-left side of the reference object 340 indicating that the camera 315 (and by inference the display 310) is slightly to the left and slightly elevated with respect to the reference object.

The relative location of the cameras 305 and 315 can be determined by calculating, based on each camera's view of the reference object, the angle of the camera (and by inference the display screen) with respect to the reference object 340. The logical position of the display screens 300 and 310 can be set in accordance with the calculated relative positions of the cameras 305 and 315.

It will be apparent to those skilled in the art that various modifications and variations can be made in the method for logically positioning multiple display screens without departing from the spirit or scope of the invention. Thus, it is intended that embodiments of the invention cover the modifications and variations of this invention provided they come within the scope of the appended claims and their equivalents.

What is claimed is:

1. A method for logically positioning a second display screen relative to a first display screen, the first and second display screens connected to a computer having a processor configured to execute instructions stored in a memory, the method comprising:
    displaying a target on the second display screen connected to the computer;
    detecting a collision event of a cursor with an edge the first display screen connected to the computer;
    in response to the collision event, logically positioning the second display screen at an intermediate logical position at the edge of the first display screen corresponding with a location of the collision event;
    calculating a projected path of the cursor on the second display from a location of the collision event;
    displaying the cursor on the second display screen connected to the computer;
    detecting by the computer a mouse event at the target;
    calculating a linear offset between the mouse event and the projected path; and
    logically repositioning the second display screen connected to the computer to a final logical position consistent with the linear offset.

2. The method of claim 1 wherein the mouse event is a click event.

3. The method of claim 1 wherein the calculating of the projected path is based on an angle of incidence of the cursor relative to the edge of the first display screen.

4. The method of claim 1 wherein the logically positioning the second display screen at the edge of the first display screen includes logically centering an edge of the second display screen with the edge of the first display screen.

5. The method of claim 4 wherein the edge of the second display screen is an opposite edge from the edge of the first display screen.

6. The method of claim 5 wherein the edge of the first display screen is a right edge of the first display screen and the edge of the second display screen is a left edge of the second display screen.

7. The method of claim 1 further comprising:
    detecting a second collision event of the cursor at a second edge of one of the first display screen or the second display screen;
    logically positioning a third display screen at the second edge;
    calculating a second projected path of the cursor;
    displaying the cursor on the third display screen;
    detecting a second mouse event;
    calculating an offset between the second mouse event and the second projected path; and
    logically repositioning the third display screen consistent with the second offset.

8. The method of claim 7 further comprising:
    displaying a second target location on the third display screen.

9. A method for logically positioning a second display screen relative to a first display screen, the first and second display screens connected to a computer having a processor configured to execute instructions stored in a memory, the method comprising:
    displaying a first reference image on the first display screen;

displaying a second reference image on the second display screen;

receiving a picture at the computer from a camera, the picture showing both of the physical position of the first display screen displaying the first reference image and the physical position of the second display screen displaying the second reference image;

calculating from the picture a relative offset in the picture between the first reference image on the first display screen and the second reference image on the second display screen; and logically positioning the second display screen with respect to the first display screen consistent with the relative offset.

10. The method of claim 9 wherein the first image and the second image are different.

11. The method of claim 9 further comprising:

displaying a third image on a third display screen;

receiving a picture of the first display screen and the third display screen calculating a second relative offset between the first image and the third image; and logically positioning the third display screen with respect to the first display screen consistent with the relative offset.

12. The method of claim 11 wherein the first image, second image, and the third image are different.

13. A method for logically positioning a second display screen relative to a first display screen based on a reference object, the first and second display screens connected to a computer having a processor configured to execute instructions stored in a memory, the first display screen attached to a first camera and the second display screen attached to a second camera, the method comprising:

taking a first picture with the first camera attached to the first display screen and connected to the computer, the first picture-including the reference object, the reference object having a plurality faces each of which are unique with respect to the other faces;

taking a second picture with the second camera attached to the second display screen and connected to the computer, the second picture also including the reference object;

calculating a relative physical position of the second display screen with respect to the first display screen based on the first picture including the reference object and the second picture including the reference object; and logically positioning the second display screen with respect to the first display screen based on the calculated relative physical position of the second display screen.

14. The method of claim 13 further comprising:

receiving a third image from a third camera associated with a third display screen, the third image also including the reference object;

calculating the relative physical position of the third display screen with respect to the first display screen based on the reference object; and logically positioning the third display screen with respect to the first display screen based on the calculated relative physical position of the third display screen.

15. The method of claim 13 wherein each of the plurality of faces includes one or more unique markings, respectively.

16. The method of claim 13 wherein each of the plurality of faces is a different color.

* * * * *